(12) United States Patent
Narita

(10) Patent No.: US 12,541,330 B2
(45) Date of Patent: Feb. 3, 2026

(54) INFORMATION PROCESSING DEVICE SETTING VALUE FOR PRINT JOB ON THE BASIS OF SETTINGS INFORMATION ACQUIRED FROM EXTERNAL DEVICE

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/469,708

(22) Filed: Sep. 19, 2023

(65) Prior Publication Data

US 2024/0004592 A1  Jan. 4, 2024

Related U.S. Application Data

(63) Continuation of application No. PCT/JP2022/011550, filed on Mar. 15, 2022.

(30) Foreign Application Priority Data

Mar. 24, 2021 (JP) .................................. 2021-050318

(51) Int. Cl.
G06F 3/12 (2006.01)

(52) U.S. Cl.
CPC .......... G06F 3/1205 (2013.01); G06F 3/1228 (2013.01); G06F 3/1238 (2013.01); (Continued)

(58) Field of Classification Search
CPC .... G06F 3/1205; G06F 3/1228; G06F 3/1238; G06F 3/1253; G06F 3/1267; G06F 3/1285

See application file for complete search history.

(56) References Cited

U.S. PATENT DOCUMENTS

2011/0157631 A1* 6/2011 Tsutsumi ................ G06F 3/126
                                                         358/1.15
2012/0257241 A1   10/2012 Narita
(Continued)

FOREIGN PATENT DOCUMENTS

| JP | 2012218244 A | 11/2012 |
|----|--------------|---------|
| JP | 2013050935 A | 3/2013  |

(Continued)

OTHER PUBLICATIONS

International Preliminary Report on Patentability and Written Opinion dated Sep. 12, 2023 issued in PCT/JP2022/011550, together with translations.

(Continued)

Primary Examiner — Nicholas Pachol
(74) Attorney, Agent, or Firm — Scully, Scott, Murphy & Presser, P.C.

(57) ABSTRACT

An information processing device has an operating system and a support program installed thereon. The operating system includes a general-purpose program. The support program is for acquiring, from an external device, settings information indicating whether stored printing is to be performed. The stored printing defines a sequence of printing in which, after the printer stores image data, the printer performs printing based on the stored image when a printing condition is satisfied. The support program is for setting, when the general-purpose program receives a print instruction from an editing application program, a setting value for a print job so that the setting value indicates that the stored printing is to be performed if the settings information indicates that the stored printing is to be performed. The support program is for sending the print job and identification information for the print job to the printer.

13 Claims, 9 Drawing Sheets

(52) U.S. Cl.
CPC .......... *G06F 3/1253* (2013.01); *G06F 3/1267* (2013.01); *G06F 3/1285* (2013.01)

(56) References Cited

U.S. PATENT DOCUMENTS

| | | |
|---|---|---|
| 2013/0033714 A1 | 2/2013 | Nakagawa |
| 2015/0070719 A1* | 3/2015 | Kuribara ............... G06F 3/1292 358/1.15 |
| 2018/0203649 A1* | 7/2018 | Ramakrishnan ......... H04N 1/00 |
| 2020/0004473 A1 | 1/2020 | Saigusa |
| 2020/0249881 A1* | 8/2020 | Hosomizo ............. G06F 3/1205 |
| 2020/0249890 A1 | 8/2020 | Kakitsuba |
| 2021/0105375 A1* | 4/2021 | Hayashi ............... H04N 1/4413 |
| 2021/0117135 A1 | 4/2021 | Suzuki |
| 2021/0303246 A1* | 9/2021 | Kaneko ................ G06F 3/1217 |
| 2022/0129215 A1* | 4/2022 | Kubo ....................... H04B 5/77 |
| 2022/0206726 A1* | 6/2022 | Dohmae ................ G06F 3/126 |
| 2022/0269454 A1* | 8/2022 | Nakajima ............. G06F 3/1238 |
| 2022/0300228 A1* | 9/2022 | Narita ................... G06F 3/1285 |
| 2023/0100715 A1* | 3/2023 | Narita ................... G06F 3/1228 358/1.15 |

FOREIGN PATENT DOCUMENTS

| | | |
|---|---|---|
| JP | 2015170003 A | 9/2015 |
| JP | 2020004158 A | 1/2020 |
| JP | 2020004254 A | 1/2020 |
| JP | 2020059199 A | 4/2020 |
| JP | 2020126319 A | 8/2020 |

OTHER PUBLICATIONS

International Search Report dated Jun. 21, 2022 issued in PCT/JP2022/011550.
Japanese Reasons for Refusal dated Sep. 17, 2024 from related Japanese Patent Application No. 2021-050318 together with an English language translation thereof.

* cited by examiner

The printer currently stores image data for 500 pages and only has a small amount of free memory. If the number of pages to print exceeds 20, please wait awhile before printing.

You still have print jobs on the printer. Please print them as soon as possible.

Printing cannot be executed as the user has print jobs remaining on the printer. Please try again after printing for the print jobs stored on the printer is completed.

The number of pages to print exceeds the printable number.
Therefore, the entire print job cannot be printed.

OK

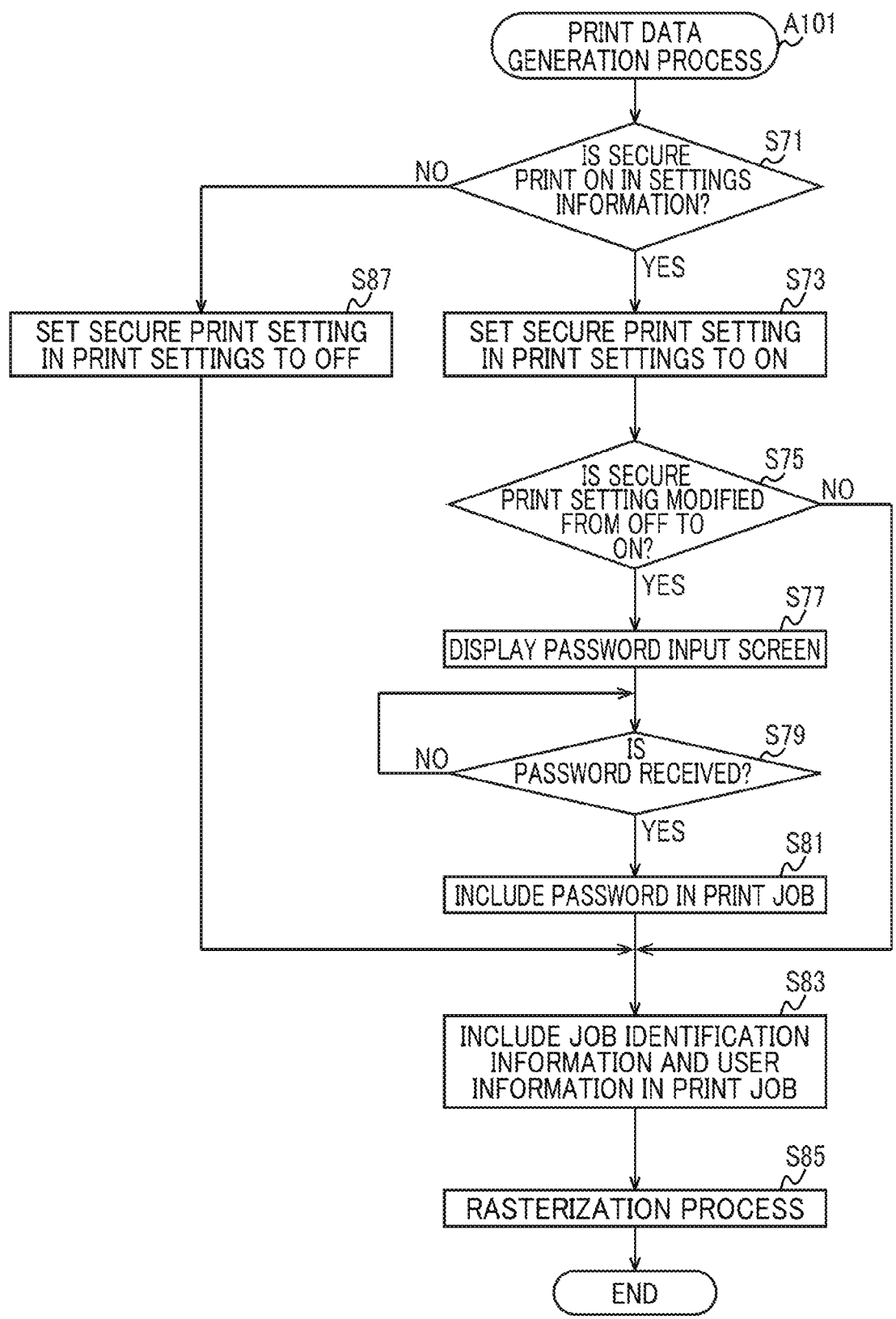

INFORMATION PROCESSING DEVICE SETTING VALUE FOR PRINT JOB ON THE BASIS OF SETTINGS INFORMATION ACQUIRED FROM EXTERNAL DEVICE

REFERENCE TO RELATED APPLICATIONS

This is a by-pass continuation application of International Application No. PCT/JP2022/011550 filed Mar. 15, 2022 claiming priority from Japanese Patent Application No. 2021-050318 filed Mar. 24, 2021. The entire contents of the International Application and the priority application are incorporated herein by reference.

BACKGROUND ART

In recent years, practical technologies have been developed for controlling printers without the use of a printer driver. One such technology utilizes a printing program that is embedded in the operating system (OS) as standard. In this technology, the OS associates a printer with the OS-standard printing program. When printing instructions are received for this printer thereafter, the OS-standard printing program can print without the need for a printer driver.

Further, some printers that print image data received from external devices are known to be capable of performing stored printing, for example. In stored printing, the printer does not immediately print image data upon receipt but rather saves the image data or converts the image data and then saves the converted data. The printer subsequently prints the stored image data when printing conditions such as authentication have been met.

DESCRIPTION

Stored printing described above tends to be used in systems requiring a high level of security, and in such systems, it is desirable for operations to be uniform throughout the entire system. However, when an information processing device accepts a setting for stored printing in each print job, the printer driver installed on the information processing device receives the setting for stored printing, making it difficult to achieve consistent operations for stored printing on all information processing devices in the system. Moreover, OS-standard general-purpose printing programs cannot even accept settings for stored printing since stored printing is a printer-specific function.

In view of the foregoing, it is an object of the present invention to provide a technology for an information processing device on which an OS-standard general-purpose printing program is installed for facilitating operations of stored printing that are consistent with those on other information processing devices.

In order to attain the above and other objects, according to one aspect, the present disclosure provides a non-transitory computer readable storage medium storing a support program installed on and executed by a computer included in an information processing device on which an operating system is installed. The operating system includes a general-purpose program embedded therein. The support program supports the general-purpose program and is associated with a printer communicable with the information processing device. The support program, when executed by the computer, causes the information processing device to perform: an acquisition process of acquiring, from an external device, settings information indicating whether or not stored printing is to be performed, the stored printing defining a sequence of printing in which, after the printer stores received image data or image data converted from the received image data, the printer performs printing based on the stored image when a printing condition is satisfied; a setting process of setting, when the general-purpose program receives a print instruction to perform printing using the printer from an editing application program installed on the information processing device, a setting value for a print job based on the print instruction so that the setting value indicates that the stored printing is to be performed if the settings information indicates that the stored printing is to be performed; and a sending process of sending the print job and identification information for the print job to the printer.

According to another aspect, the present disclosure provides a system. The system includes a printer, and an information processing device. The printer is configured to perform stored printing. The stored printing defines a sequence of printing in which, after the printer stores received image data or image data converted from the received image data therein, the printer performs printing based on the stored image data when a printing condition is satisfied. The information processing device is communicable with the printer. The information processing device is configured to perform: an acquisition process of acquiring, from an external device, settings information indicating whether or not stored printing is to be performed, the stored printing defining a sequence of printing in which, after the printer stores received image data or image data converted from the received image data therein, the printer performs printing based on the stored image data on the printing condition; a setting process of setting, when the general-purpose program receives a print instruction to perform printing using the printer from an editing application program installed on the information processing device, a setting value for a print job based on the print instruction so that the setting value indicates that the stored printing is to be performed if the settings information indicates that the stored printing is to be performed; and a sending process of sending the print job and identification information for the print job to the printer.

In the above structure, in an information processing device incorporating the auxiliary program, the operations for stored print are made uniform throughout the entire system.

FIGS. 4A-4D are explanatory diagrams illustrating notification screens.

FIG. 10 is a flowchart illustrating a print data generation process.

An embodiment of a personal computer (PC) using a support program will be described while referring accompanied drawings. The following description discloses a printing system including a printer having a printing function, and the PC that is electrically connected to the printer. The PC stores a support program to be executed thereby. The support program can communicate with the printer.

Figure 1:
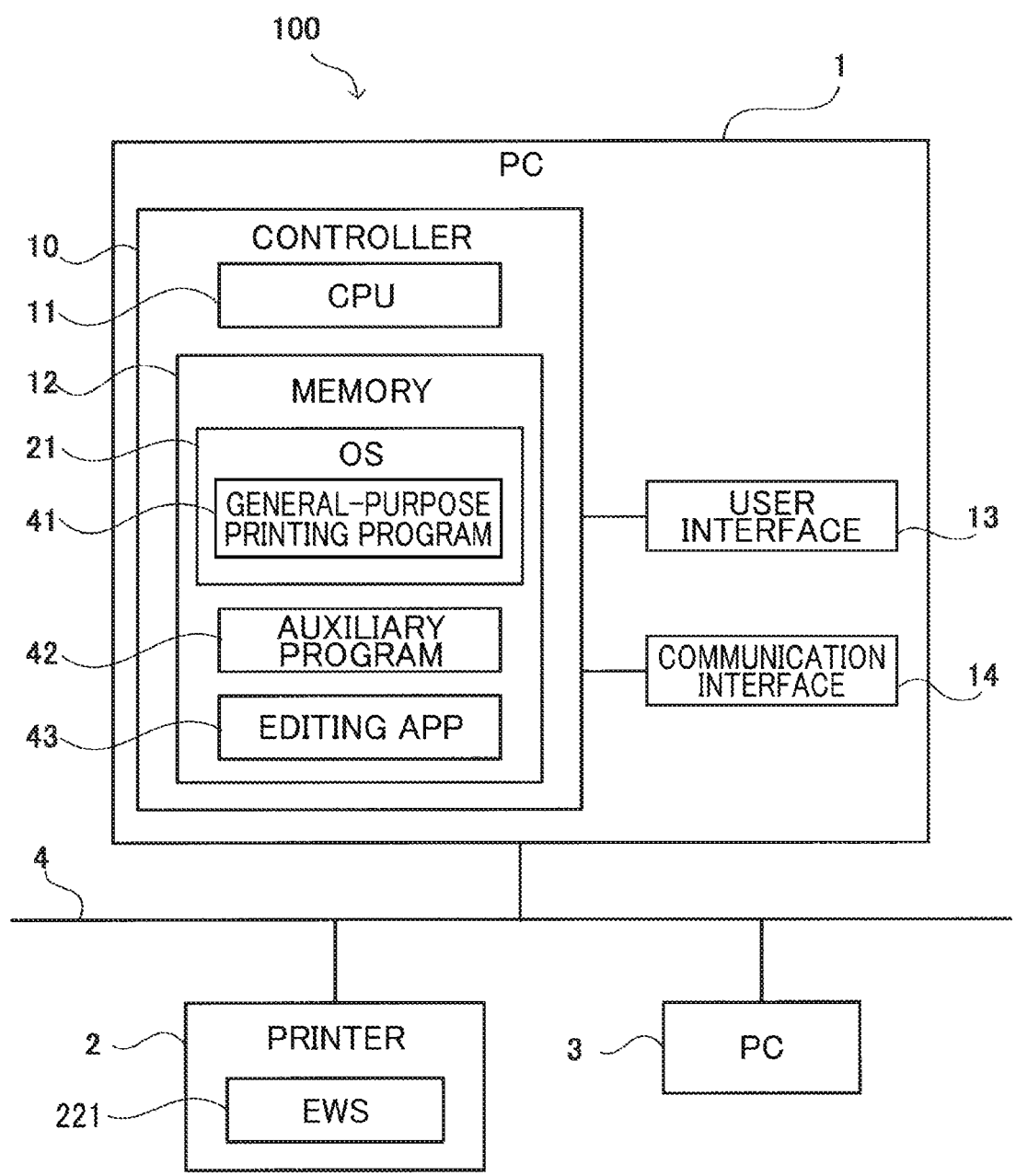
FIG. 1 is a block diagram illustrating electrical configurations of a personal computer.

FIG. 1 shows a printing system 100 according to the present embodiment that is employed in an office, for example. As shown in FIG. 1, the printing system 100 includes a plurality of personal computers (PCs 1 and 3 in this embodiment) and a printer 2, which are all connected to a network 4. The PCs 1 and 3 are examples of the information processing device. The printer 2 is a device possessing a print function. The printer 2 is connected to and capable of communicating with a plurality of information processing devices (the PCs 1 and 3 in this embodiment). However, the number of information processing devices connected to the printer 2 is not limited to this example. Further, the information processing devices are not limited to PCs but may be mobile terminals, such as smartphones and tablet computers. Because the PC 1 and PC 3 in this example have a similar configuration, the following description will focus on the configuration of the PC 1.

As shown in FIG. 1, the PC 1 of this embodiment is provided with a controller 10 that includes a CPU 11, and a memory 12. The CPU 11 is an example of the computer. The PC 1 is also provided with a user interface 13, and a communication interface 14, both of which are electrically connected to the controller 10. Note that the controller 10 in FIG. 1 is a general concept that covers all hardware and software used for controlling the PC 1 and may not be a single piece of hardware present in the PC 1.

The CPU 11 executes various processes according to programs read from the memory 12 with user operations. The memory 12 stores various data and various programs including various application programs (hereinafter also referred to as "apps"). The buffer provided in the CPU 11 is an example of the memory. The memory 12 is used as a work area for executing various processes. Examples of the memory 12 may be ROM, RAM, a hard disk drive, or the like built into the PC 1 or may be any storage medium that is readable and writable by the CPU 11, such as CD-ROM, DVD-ROM, or other storage media.

The user interface 13 includes hardware that displays screens for reporting information to the user, and hardware that receives operations performed by the user. The user interface 13 may be a set of devices that includes a display capable of displaying information; and a mouse, keyboard, and the like with input-receiving functions. Alternatively, the user interface 13 may be a touchscreen that is provided with both a display function and an input-receiving function.

The communication interface 14 includes hardware for communicating with an external device, such as the printer 2. The communication standard employed by the communication interface 14 may be Ethernet (registered trademark), Wi-Fi (registered trademark), Universal Serial Bus (USB), or the like. Alternatively, the PC 1 may be provided with a plurality of communication interfaces 14 supporting a plurality of communication standards.

As shown in FIG. 1, the memory 12 of the PC 1 stores an operating system (hereinafter "OS") 21, an auxiliary program 42, and an editing app 43. The OS 21 includes a general-purpose printing program 41. The OS 21 may be one of Windows (U.S. trademark of Microsoft Corporation), macOS (U.S. trademark of Apple Inc.), LINUX (U.S. trademark of Torvalds, Linus), iOS (U.S. trademark of Cisco Technology, Inc.), and Android (U.S. trademark of Google LLC Limited), for example. The auxiliary program 42 is an example of the support program. The editing app 43 is an example of the editing application.

The general-purpose printing program 41 is an OS-standard program for printing on various printers, including the printer 2, in accordance with user instructions. In the present embodiment, the general-purpose printing program 41 includes a function for generating intermediate image data based on the image data to be printed.

The general-purpose printing program 41 supports functions that are generally or universally available on printers of a plurality of models provided by various printer vendors. The general-purpose printing program 41 does not support all functions that are specific to the various types of printers but rather limits support to generic functions available on all printers.

The auxiliary program 42 is a program or a set of programs that execute processes based on instructions from the OS 21 in conjunction with the process of the general-purpose printing program 41 and is an application that provides support for controlling the target hardware. The auxiliary program 42 of the present embodiment supports the model of printer 2 connected to the PC 1. The auxiliary program 42 is started from the general-purpose printing program 41 when the OS 21 receives an instruction to execute a print on the printer 2 using the general-purpose printing program 41, for example. The auxiliary program 42 is called a hardware support application (HSA), for example.

The auxiliary program 42 can receive various types of commands from the general-purpose printing program 41 and executes various processes based on those commands. The auxiliary program 42 may be a combination of a plurality of programs each receives execution commands or may be a single program capable of executing different processes according to the received command.

The vendors of printers may prepare auxiliary programs for each type of printer. For example, one auxiliary program may be prepared for inkjet printers and another auxiliary program may be prepared for laser printers. When a new printer is connected to the PC 1, for example, the OS 21 of the PC 1 downloads an auxiliary program suited to the type of the connected printer from a server or the like and installs the program on the PC 1. Next, the OS 21 stores identification information for the installed auxiliary program in the memory 12 in association with printer information on the newly connected printer. Note that an auxiliary program may be prepared for each model of printer or for each model series, rather than each type of printer.

The editing app 43 is used for creating and editing image data and document data, for example. Examples of the editing app 43 include Word and PowerPoint developed by Microsoft (U.S. trademark of Microsoft Corporation), or an app developed by the vendor of the printer 2. The editing app 43 accepts user operations that include instructions to execute prescribed operations on the printer 2. Specifically, the editing app 43 receives print execution instructions via the user interface 13 for executing printing operations on the printer 2, for example.

The printer 2 receives a print job from the PC 1 or the like and executes printing based on the received print job, for example. The print job includes image data, print settings, job identification information for identifying the print job, and user information for identifying the logged-in user who sent the print job, for example. The job identification information is an example of the identification information for the print job.

The printer 2 receives print settings or changes to print settings via a control panel or an administrator terminal that manages the printer 2 and stores these settings. The print settings include a setting related to stored printing. The stored printing or stored print is a printing procedure executed by the printer 2. According to this printing procedure, the printer 2 does not immediately perform printing upon receiving image data but rather stores the received image data or converts the image data and stores the converted data and later prints based on the stored data when a printing condition is met. The printing condition may include a condition that the a print instruction is inputted, that an appropriate password is inputted, or that a user logs into the printer 2, for example. Such stored printing tends to be used in systems requiring a high level of security, and the operations for the stored printing are preferably made uniform throughout the entire system. The printer 2 is provided with an embedded web server (EWS) 221, which manages settings information regarding whether to perform stored printing.

The setting for the stored printing (hereinafter, referred to as the stored-print setting) is a print setting that is specific to the printer 2 and is not supported by the general-purpose printing program 41. The PC 1 can receive a stored-print setting in each print job through the auxiliary program 42. The PC 1 may receive a stored-print setting that differs from the stored-print setting saved on the printer 2.

Figure 2:
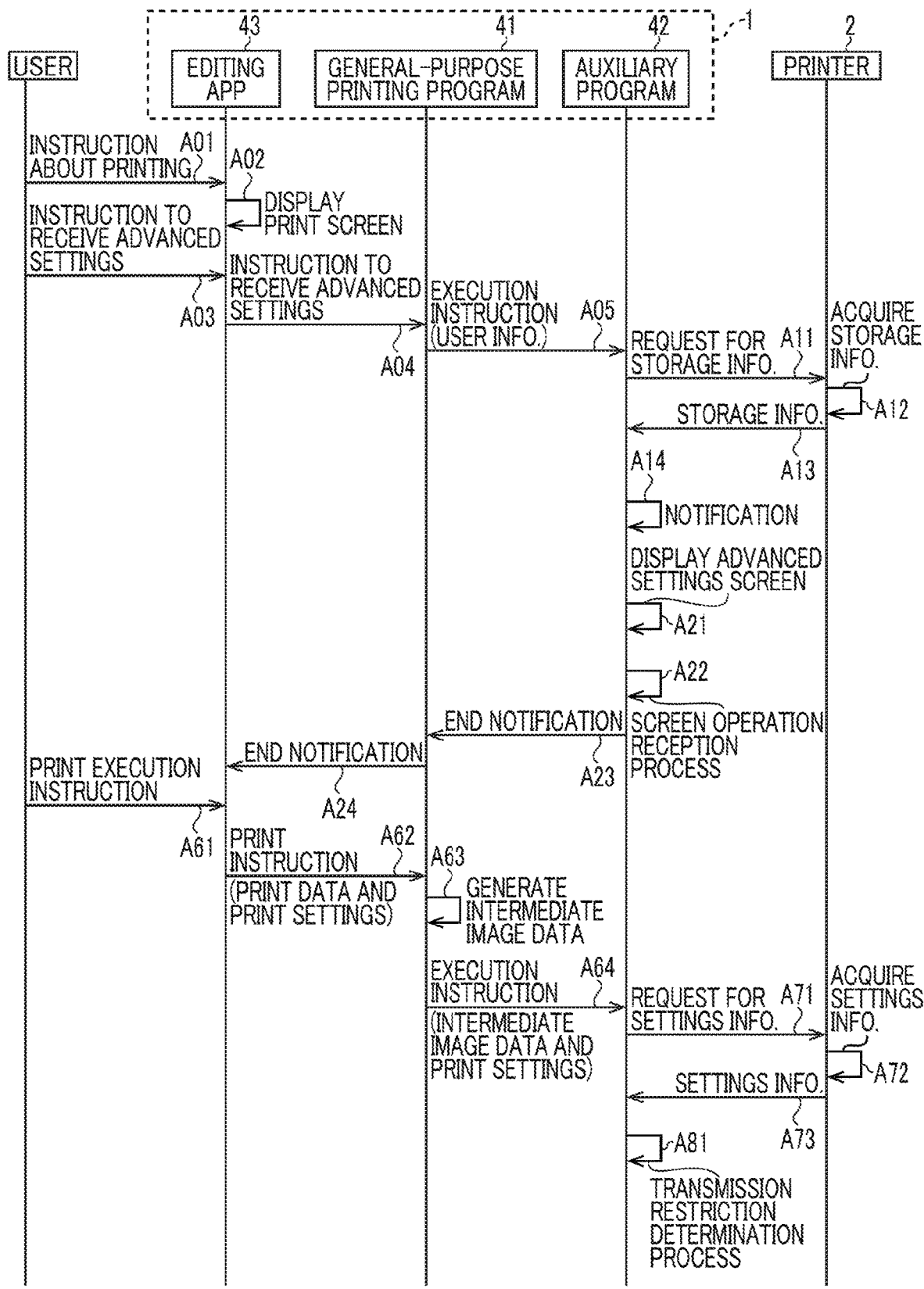
FIG. 2 is a sequence diagram illustrating a print operation performed by programs.
Figure 3:
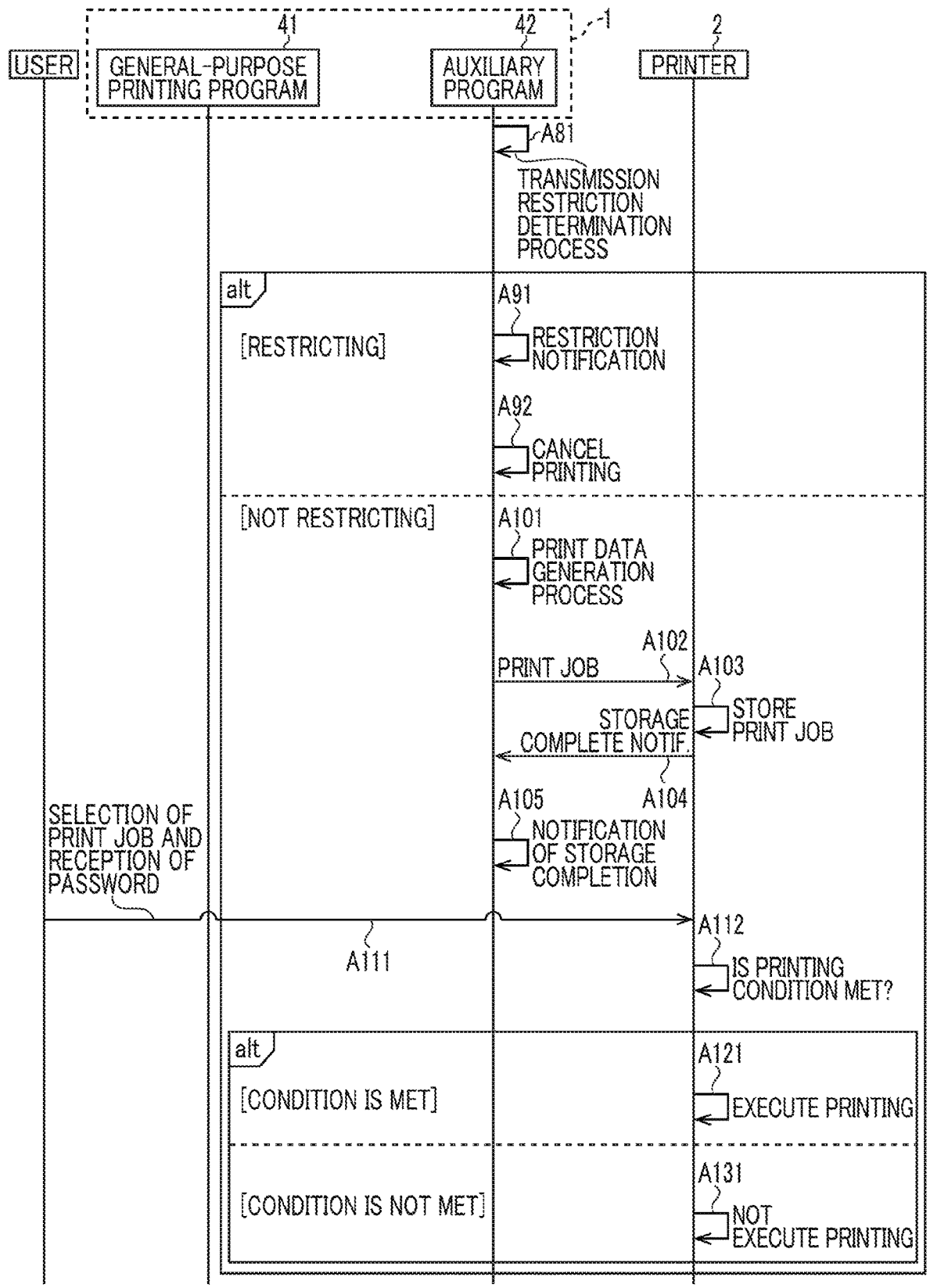
FIG. 3 is a sequence diagram illustrating the print operation performed by the programs.

Next, a printing procedure that includes operations of the auxiliary program 42 according to the present embodiment will be described with reference to the sequence charts in FIGS. 2 and 3. FIGS. 2 and 3 show operations performed when the auxiliary program 42 supporting the printer 2 is installed on the PC 1 and when an application such as the editing app 43, which accepts a print instruction, receives a print execution instruction to execute printing on the printer 2 using the general-purpose printing program 41.

The processes in the present embodiment and process steps in the flowcharts essentially indicate processes performed by the CPU 11 according to commands described in the auxiliary program 42 and other programs. Processes performed by the CPU 11 include hardware control using the API in the OS 21. A detailed description of the role of the OS 21 is omitted in this specification when describing operations according to the programs. Further, the term "acquire" is used as a concept that does not necessarily require a request.

The editing app 43 receives instructions from the user for creating and editing documents, diagrams, and the like. In A01 the editing app 43 receives an instruction related to printing a selected document or the like. Upon receiving this instruction, in A02 the editing app 43 displays a print screen on the user interface 13 for receiving user instructions. In the print screen, the editing app 43 accepts a print execution instruction, a selection of printer to be used for printing, instructions for basic print settings, and an instruction to begin receiving advanced print settings.

When in A03 the editing app 43 receives an instruction to begin receiving advanced print settings while the printer 2 is selected in the displayed print screen, the editing app 43 transfers the advanced print settings instruction to the OS 21. When the OS 21 receives the advanced print settings instruction, in A04 the OS 21 launches the general-purpose printing program 41 and transfers an instruction to the general-purpose printing program 41 to begin receiving advanced print settings. The instruction to begin receiving advanced print settings is an example of the display instruction. Upon receiving the instruction to begin receiving advanced print settings, in A05 the general-purpose printing program 41 activates the auxiliary program 42 and sends an execution instruction to the auxiliary program 42 corresponding to the printer 2, i.e., the currently selected printer, instructing the auxiliary program 42 to accept advanced print settings. In A05 user information for identifying the logged-in user of the PC1 may be sent together with the instruction.

In response to this execution instruction, in A11 the auxiliary program 42 issues a request to the printer 2 to transmit storage information on print jobs. In A12 the printer 2 specifies all the print jobs stored on the printer 2 and returns storage information on the specified print jobs stored on the printer 2 to the auxiliary program 42 in response. In A13 the auxiliary program 42 acquires the storage information from the printer 2 by receiving the storage information via the communication interface 14. In A14 the auxiliary program 42 uses the user interface 13 to notify the user of the stored print jobs based on the acquired storage information. The processes of A11-A13 are an example of the storage information acquisition process. The process of A14 is an example of the notification information.

The storage information may indicate the number of stored print jobs or the printing quantity (for example, the number of pages to be printed according to the stored print jobs) or may specify the available memory space based on the size of the stored print jobs. Notification information in the notification of A14 may be information on the print jobs currently stored on the printer 2 or may be information on the number or quantity of print jobs that can be stored furthermore. For example, the auxiliary program 42 displays a message 300A on the user interface 13. As shown in FIG. 4A, the message 300A is "The printer currently stores image data for 500 pages and only has a small amount of free memory. If the number of pages to print exceeds 20, please wait awhile before printing." Through this message, the user can confirm on the PC 1 the status of stored print jobs and the available memory on the printer 2. The user can also learn that, if an instruction for printing is executed now, image data of that print job cannot be properly stored on the printer 2 and cannot obtain the expected printing results. The message 300A is an example of the notification information.

The auxiliary program 42 may acquire storage information indicating some of the print jobs stored on the printer 2 rather than acquiring storage information for all print jobs stored on the printer 2.

For example, when the auxiliary program 42 requests the printer 2 to send storage information in A11, the auxiliary program 42 may include in the request the user information on the logged-in user received in A05. In this case, when acquiring print jobs stored on the printer 2 in A12, the printer 2 extracts print jobs associated with the user information in the request and in A13 sends storage information based on the extracted print jobs to the auxiliary program 42. In A13 the auxiliary program 42 acquires the storage information that is specific to the logged-in user from the printer 2 by receiving the storage information via the communication interface 14.

Note that the auxiliary program 42 may also acquire storage information specific to the logged-in user by first receiving storage information for all the print jobs stored on the printer 2 from the printer 2 and subsequently extracting only those print jobs associated with the user information on the logged-in user from the received storage information.

In A14 the auxiliary program 42 may then display notification information to the user based on the print jobs associated with the logged-in user. For example, suppose that the auxiliary program 42 recognizes, from the storage information acquired from the printer 2, that print jobs of the logged-in user remain on the printer 2. In this case, the auxiliary program 42 displays a message 300B on the user interface 13, as shown in the example of FIG. 4B. In this example, the message 300B is "You still have print jobs on the printer. Please print them as soon as possible." The message 300B is an example of the notification information.

In this way, when the auxiliary program 42 does not display notification information on print jobs other than those specific to the logged-in user, the logged-in user can more easily see that user still has print jobs to print. Further, the printer 2 in this system is configured to store print jobs that were received from a plurality of PCs (the PCs 1 and 3 in the present embodiment). Consequently, the printer 2 may easily accumulate a large number of print jobs. For this reason, a user is more likely to notice the user's own print jobs remaining on the printer 2 and to print those print jobs when the auxiliary program 42 displays the message 300B on the user interface 13, as in the present embodiment. Accordingly, fewer print jobs stored in the printer 2 will be left unprinted, decreasing the likelihood that the printer 2 will accumulate a large number of print jobs.

Here, the printer 2 may have a storage condition limiting the number of print jobs that can be stored by each user identified by corresponding user information (e.g., a condition that allows each user to store only one print job). In this case, in a case that the auxiliary program 42 determines that the number of print jobs stored on the printer 2 for the logged-in user reaches the number defined by the storage condition on the basis of the storage information when the logged-in user inputs an instruction for printing, the auxiliary program 42 may display a message 300C on the user interface 13, as shown in the example of FIG. 4C. Here, the message 300C is "Printing cannot be executed as the user has print jobs remaining on the printer. Please try again after printing for the print jobs stored on the printer is completed." Accordingly, the logged-in user will quickly print the user's print jobs remaining on the printer 2 in order to execute the current print job. This method will promote the printing of print jobs stored on the printer 2, preventing the printer 2 from accumulating a large number of print jobs. The message 300C is an example of the notification information.

Figure 5:
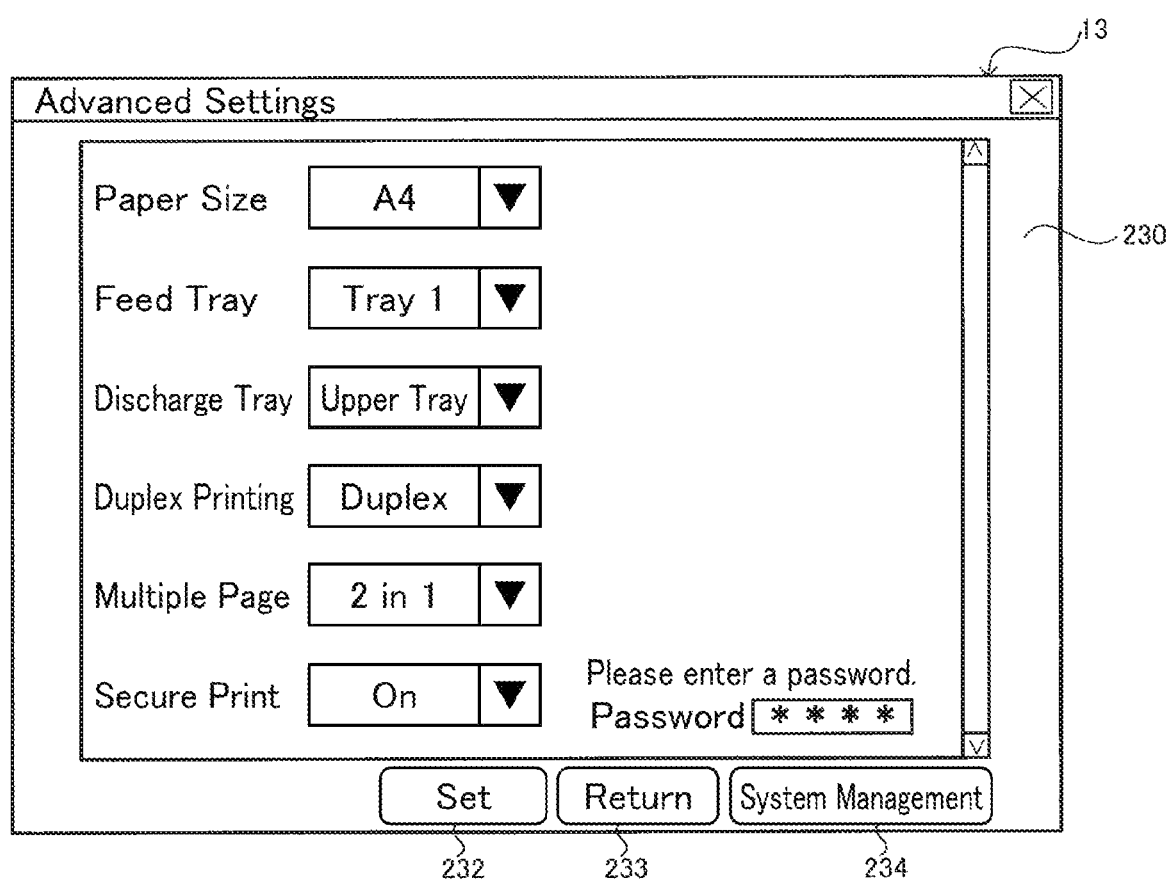
FIG. 5 is an explanatory diagram illustrating an advanced settings screen.

In A21 the auxiliary program 42 displays an advanced settings screen on the user interface 13 for accepting print settings for printing on the printer 2. The advanced setting screen is an example of the settings screen. The process of A21 is an example of the display process. FIG. 5 shows an example of an advanced settings screen 230.

As shown in the example of FIG. 5, the advanced settings screen 230 includes various print settings items. The print settings items include items specific to the printer 2 that are not supported by the general-purpose printing program 41. The items specific to the printer 2 include the item for the secure print, for example. Hence, print settings not supported by the general-purpose printing program 41 can be configured in the advanced settings screen 230. Note that the print settings items displayed in the advanced settings screen 230 may also include items that are supported by the general-purpose printing program 41.

Each item in the advanced settings screen 230 displays the value currently set in the auxiliary program 42 (hereinafter referred to as the "current PC-side value"). The value of each item can be modified by displaying and selecting one of a plurality of values in a menu or by entering an arbitrary value in a field. Each item can be set to a value that cannot be set in the general-purpose printing program 41, provided that the value is supported by the printer 2.

For example, secure print, which is a type of stored print displayed in the advanced settings screen 230, can be set either to "OFF", indicating that a secure print is not to be performed, or "ON", indicating that a secure print is to be performed. The secure print is a type of stored printing in which a password is assigned to a print job and the print job is printed on the printing condition that the password was inputted into the printer 2. When "ON" has been selected as the secure print setting, the advanced settings screen 230 displays a password input field for inputting a password. Accordingly, the auxiliary program 42 can receive a password when accepting print settings for a secure print. The password is an example of the authentication information. The authentication information is not limited to the password but may be a PIN or the like. Additionally, the password input field may be displayed at all times in the advanced settings screen 230, but a password inputted into the password input field would be accepted only when the secure print setting is "ON".

The advanced settings screen 230 also includes a Set button 232, a Return button 233, and a System Management button 234. The Set button 232 is an operation receiving icon for receiving an instruction to accept the print settings inputted through the advanced settings screen 230. The Return button 233 is an operation receiving icon for receiving an instruction to return to the previous screen without accepting the print settings. The System Management button 234 is an operation receiving icon for receiving an instruction to access the EWS 221 of the printer 2. The System Management button 234 is an example of an operation icon.

Returning to FIG. 2, after displaying the advanced settings screen 230, in A22 the auxiliary program 42 performs a screen operation reception process. In this process, the auxiliary program 42 receives operations on the advanced settings screen 230 via the user interface 13. The screen operation reception process will be described with reference to the flowchart in FIG. 6. The CPU 11 of the PC 1 executes this process.

Figure 6:
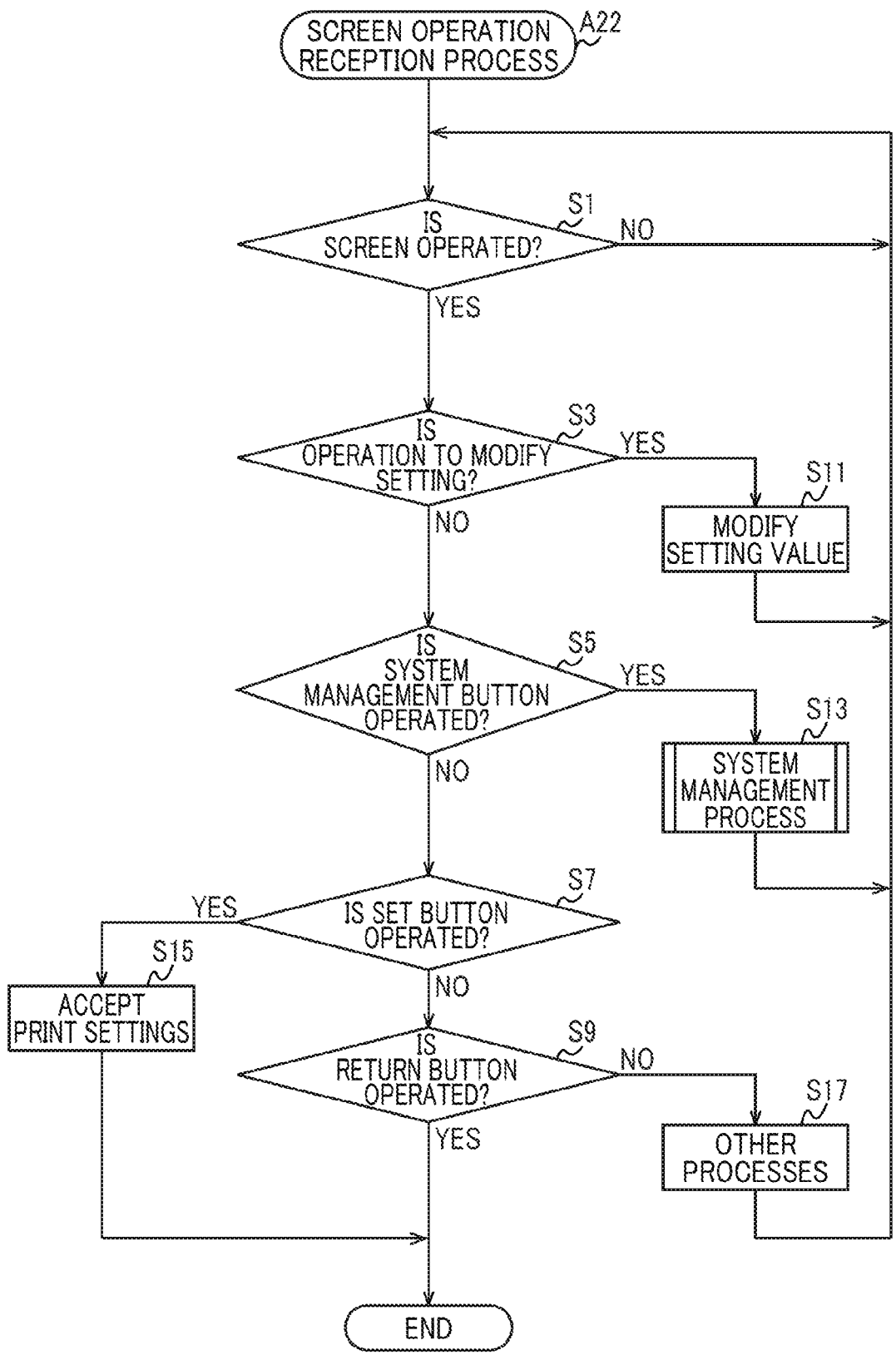
FIG. 6 is a flowchart illustrating a screen operation reception process.

In S1 of FIG. 6, the CPU 11 determines whether the advanced settings screen 230 was operated. The CPU 11 continues to wait at S1 while no operation receiving icons displayed in the advanced settings screen 230 have been operated (S1: NO). When the CPU 11 determines an operation receiving icon was operated in the advanced settings screen 230 (S1: YES), in S3 the CPU 11 determines whether an operation was received to modify a value for one of the items displayed in the advanced settings screen 230 shown in FIG. 5.

When the CPU 11 determines that an operation to modify a value for an item was received (S3: YES), in S11 the CPU 11 modifies the value of this setting item and subsequently returns to S1. For example, when the secure print setting in the advanced settings screen 230 was changed from "ON" to "OFF" through the user interface 13, the CPU 11 modifies the setting stored in the memory 12 for the secure print setting from "ON" to "OFF". In this case, the password input field is removed from the display so that passwords are no longer accepted. On the other hand, when the secure print setting in the advanced settings screen 230 was changed from "OFF" to "ON" through the user interface 13, the CPU 11 modifies the setting stored in the memory 12 for secure printing from "OFF" to "ON". In this case, the password input field is displayed in the advanced settings screen 230.

When the CPU 11 determines that an operation receiving icon displayed in the advanced settings screen 230 of FIG. 5 was operated but that the operation was not for modifying a setting (S1: YES, S3: NO), in S5 the CPU 11 determines whether the System Management button 234 was operated. When the System Management button 234 was operated via the user interface 13 (S5: YES), in S13 the CPU 11 executes a system management process. The system management process is performed to manage settings for the printer 2. The system management process will be described with reference to the flowchart in FIG. 7. The CPU 11 of the PC 1 executes this process.

Figure 7:
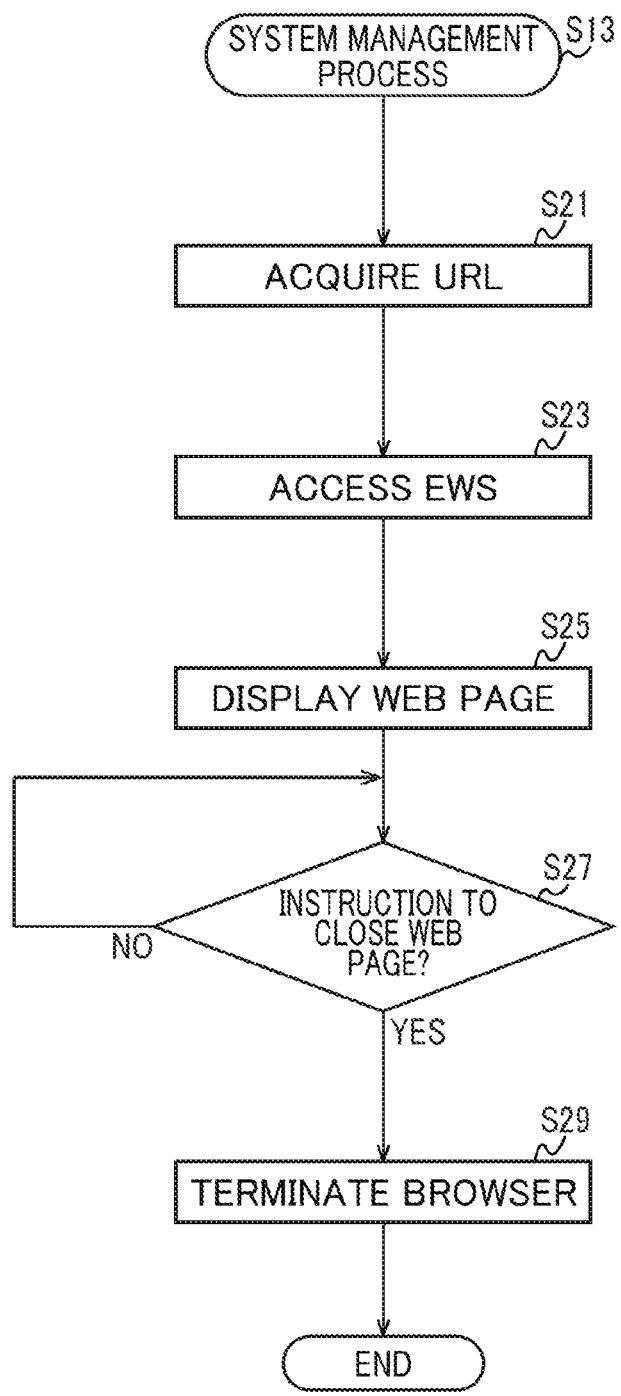
FIG. 7 is a flowchart illustrating a system management process.

In S21 of FIG. 7, the CPU 11 acquires the URL corresponding to the printer 2 that has been selected as the print execution target in the print settings. The URL may be stored in a nonvolatile area of the memory 12 through automatic input by the printer 2 when the auxiliary program 42 is installed on the PC1 or may be stored in nonvolatile memory of the memory 12 through manual input by the user on the user interface 13, for example. Thus, the CPU 11 acquires the URL from the nonvolatile memory of the memory 12. When the URL is not stored in memory, the CPU 11 may request the user to input the URL in S21. The URL includes information specifying the IP address of the printer 2, for example.

In S23 the CPU 11 starts up a browser and accesses the address for the EWS 221 of the printer 2 on the basis of the URL acquired in S21. The EWS 221 provides the PC 1 with web pages related to system management. In S25 the CPU 11 opens a browser to display the web page provided by the EWS 221 on the user interface 13. In S25 the CPU 11 accepts instructions via the web page, as described later. The CPU 11 waits at S27 while an instruction to close the web page has not been received (S27: NO). When the CPU 11 receives an instruction to close the web page (S27: YES), in S29 the CPU 11 terminates the browser, disconnects from the EWS 221, and subsequently ends the system management process. The process of S25 is an example of the web page display process.

The EWS 221 accepts instructions via the web page, which the CPU 11 displays in S25 on the user interface 13 of the PC 1, to modify settings information indicating whether or not to perform a secure print, which is a type of stored print. In other words, when a function to set or modify the setting for a secure print was selected in the web page, the EWS 221 requests the user to input an administrator password. When the administrator is successfully authenticated, the EWS 221 displays a settings information modification reception screen 240 shown in the example of FIG. 8 on the user interface 13.

The settings information modification reception screen 240 accepts changes to settings information in a settings display area 241. Specifically, the settings display area 241 is provided with radio buttons for exclusively selecting "ON" for indicating that a secure print is to be performed or "OFF" for indicating that a secure print is not to be performed. The settings information modification reception screen 240 also displays an OK button 242 and a Cancel button 243. When the OK button 242 displayed in the settings information modification reception screen 240 is operated, the EWS 221 accepts the modified settings information indicating whether or not to perform a secure print based on the input content in the settings display area 241. When the Cancel button 243 displayed in the settings information modification reception screen 240 is operated, the EWS 221 does not accept the modified settings information.

Returning to FIG. 6, after completing the system management process of S13, the CPU 11 returns to S1. Further, when the CPU 11 determines in S5 that the System Management button 234 was not operated in the advanced settings screen 230 (S5: NO), in S7 the CPU 11 determines whether the Set button 232 displayed in the advanced settings screen 230 was operated via the user interface 13. When the Set button 232 was operated (S7: YES), in S15 the CPU 11 accepts the print settings displayed in the advanced settings screen 230 and subsequently ends the screen operation reception process. In this case, the existing print settings stored in a nonvolatile area of the memory 12 accessible by the auxiliary program 42 are overwritten with the print settings accepted in S15. As a result, the values of these accepted print settings can be displayed as the current PC-side values for the next time the user requests to modify advanced print settings. The print settings accepted in S15 may also be stored in a volatile area of the memory 12.

When the CPU 11 determines in S7 that the Set button 232 displayed in the advanced settings screen 230 was not operated (S7: NO), in S9 the CPU 11 determines whether the Return button 233 displayed in the advanced settings screen 230 was operated via the user interface 13. When the Return button 233 was operated (S9: YES), the CPU 11 ends the screen operation reception process of FIG. 6. However, when the Return button 233 was not operated (S9: NO), i.e., when an operation other than an operation to modify a setting or an operation on one of the buttons 232-234 was received, in S17 the CPU 11 executes a process corresponding to the other operation, and subsequently returns to S1.

After completing the screen operation reception process of FIG. 6, the auxiliary program 42 stops displaying the advanced settings screen 230 and in A23 transfers an end notification to the general-purpose printing program 41. At this time, the auxiliary program 42 also passes the print settings accepted via the advanced settings screen 230 to the general-purpose printing program 41. In A24 the general-purpose printing program 41 passes the end notification and the print settings received from the auxiliary program 42 to the editing app 43.

As shown in FIG. 2, in A61 the editing app 43 receives a print execution instruction from the user in the print screen, and in A62 transfers a print instruction to the general-purpose printing program 41. The general-purpose printing program 41 acquires information specifying the image data to be printed and information specifying the print settings in the print instruction. These print settings include print settings received through the advanced settings screen 230 in A24.

In A63 the general-purpose printing program 41 generates intermediate image data by converting the image data included in the print settings to a prescribed format defined for intermediate image data and generates a print job that includes this intermediate image data and information on the print settings. The general-purpose printing program 41 may receive various types of image data included in the editing app 43. The general-purpose printing program 41 converts the image data received from the editing app 43 to intermediate image data of the prescribed format suitable for generating print data. When the image data included in the print instruction is already suitable for generating print data, the process of generating intermediate image data may be omitted and the image data may be used in its current form as the intermediate image data. Data in the XPS document format (XPS data) is one example of the intermediate image data.

In A64 the general-purpose printing program 41 outputs an execution instruction to the auxiliary program 42. Further, in A64 the general-purpose printing program 41 transmits to the auxiliary program 42 the intermediate image data generated in A63 and information on the print settings together with the execution instruction. The execution instruction may include the user information for the logged-in user. That is, in A64 the general-purpose printing program 41 passes the intermediate image data generated in A63 and information on the print settings to the auxiliary program 42. Thus, the print settings include those print settings received via the advanced settings screen 230 in A23. In A64 the general-purpose program 41 activates the auxiliary program 42 before transmitting the execution instruction.

In A71 the auxiliary program 42 issues a request to the printer 2 via the communication interface 14 for the transmission of settings information in response to the execution instruction from the general-purpose printing program 41. In A72 the printer 2 acquires the settings information managed in the EWS 221 and returns the acquired settings information to the PC 1 as a response. In A73 the auxiliary program 42 acquires the settings information from the printer 2 by receiving the settings information via the communication interface 14. The process of A71-A73 are an example of the acquisition process. The printer 2 is an example of the external device.

In A81 the auxiliary program 42 performs a transmission restriction determination process. The transmission restriction determination process is performed to determine whether to restrict the transmission of print jobs. This process will be described next with reference to the flowchart in FIG. 9. The CPU 11 of the PC 1 executes the transmission restriction determination process.

Figure 9:
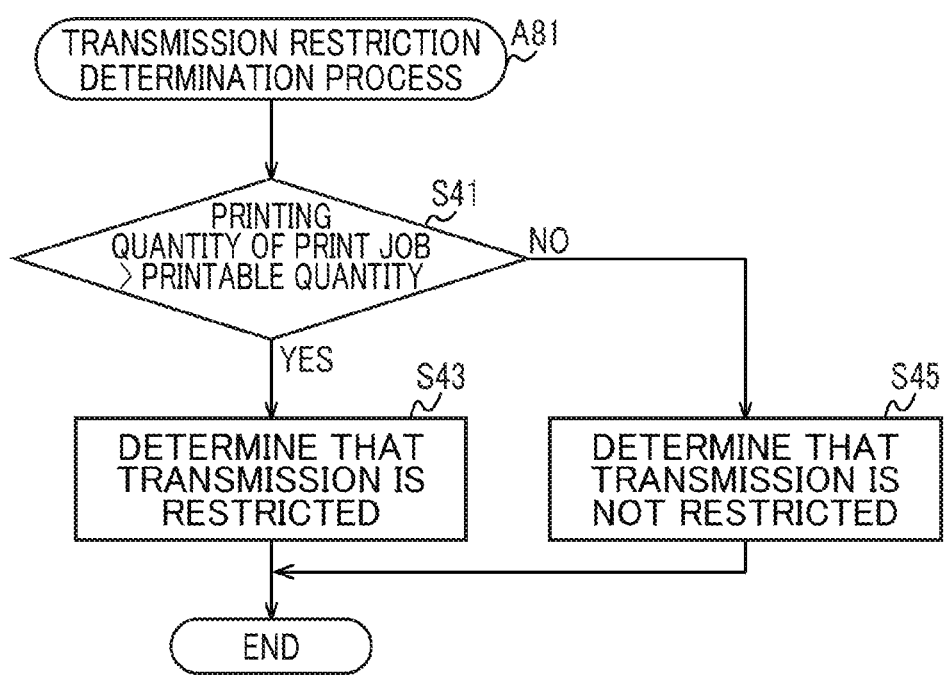
FIG. 9 is a flowchart illustrating a transmission restriction determination process.

In S41 of FIG. 9, the CPU 11 identifies the printing quantity of the print job based on the intermediate image data received from the general-purpose printing program 41 and determines whether the identified printing quantity of the print job exceeds the printable quantity based on the storage information acquired from the printer 2 in A13 of FIG. 2. When the printing quantity of the print job does not exceed the printable quantity (S41: NO), in S45 the CPU 11 determines that transmission is "not restricted" and ends the transmission restriction determination process. However, when the printing quantity of the print job exceeds the printable quantity (S41: YES), in S43 the CPU 11 determines that transmission is "restricted" and ends the transmission restriction determination process.

The process shown in FIG. 2 proceeds to the process shown in FIG. 3. Both FIGS. 2 and 3 show the same step A81 to show that the end of the process shown in FIG. 2 matches the beginning of the process shown in FIG. 3. So, the step A81 is executed only once in the combined processes of FIGS. 2 and 3. After completing A81, in A91 the auxiliary program 42 issues a restriction notification when "restricted" was determined in the transmission restriction determination process of A81. For example, the auxiliary program 42 displays a message 300D on the user interface 13, as shown in FIG. 4D. Here, the message 300D is "The number of pages to be printed exceeds the printable number. Therefore, the entire print job cannot be printed." After receiving an operation on the OK button displayed in the message 300D via the user interface 13, in A92 the auxiliary program 42 cancels printing. In this way, the auxiliary program 42 avoids transmitting a print job to the printer 2 when the image data targeted for printing cannot be printed in its entirety. The process of A91 is an example of the notification process. The message 300D is an example of the notification information. The process of A92 is an example of the restriction process.

Note that the message 300D may also include a button for accepting modifications to the printing quantity of the print job (number of pages being printed), for example. In this case, the auxiliary program 42 may restrict the transmission of a print job in the process of A91 by cancelling the print or accepting modifications to the printing quantity of the print job, such as modifications to the number of pages being printed or the printing range.

On the other hand, when "not restricted" was determined in the transmission restriction determination process of A81, in A101 the auxiliary program 42 executes a print data generation process. This process will be described next with reference to the flowchart in FIG. 10. The CPU 11 of the PC 1 executes the print data generation process.

In S71 of FIG. 10, the CPU 11 determines whether the settings information acquired from the printer 2 in A73 of FIG. 2 includes the value "ON" to indicate that a secure print is to be performed. When the settings information specifies "ON" (S71: YES), in S73 the CPU 11 sets the secure print setting included in the print settings of the print job to "ON". As a result, the secure print setting specified in the print job is consistent with the settings information on the printer 2. The process of S73 is an example of the setting process.

In S75 the CPU 11 determines whether the secure print setting was modified from "OFF" to "ON" in S73. A secure print requires a password as the printing condition. However, when the secure print setting received via the advanced settings screen 230 is "OFF", a password is not included in the print settings for the print job. Therefore, when the secure print setting was changed from "OFF" to "ON" (S75: YES), in S77 the CPU 11 displays a password input screen on the user interface 13 to receive password input. In S79 the CPU 11 waits while a password has not been received via the password input screen (S79: NO).

When a password is inputted and received through the password input screen (S79: YES), in S81 the CPU 11 includes the password in the print job and subsequently advances to S83. The processes S77-S81 is an example of the authentication setting process.

On the other hand, when the secure print setting was not modified from "OFF" to "ON" in the process of S73 (S75: NO), the CPU 11 skips the process from S77 to S81 and advances directly to S83. Here, password input is unnecessary because a password was received through the advanced settings screen 230 and is already included in the print settings provided in the print job.

Further, when the settings information acquired from the printer 2 specifies the value "OFF" to indicate that a secure print is not to be performed (S71: NO), in S87 the CPU 11 sets the secure print setting included in the print settings for the print job to "OFF" and subsequently advances to S83. Note that the CPU 11 may simply continue the process in accordance with the secure print setting established in the advanced settings screen 230 in this case. In other words, the process of S87 may be omitted. For example, when the user sets the secure print setting in the advanced settings screen 230 to "ON" while the settings information acquired from the printer 2 indicates "OFF", the user setting entered by the user in the advanced settings screen 230 ("ON") may be given priority over the settings information acquired from the printer 2 ("OFF").

In S83 the CPU 11 includes job identification information and the user information in the print job and advances to S85. In this way, the user can select and print a specific print job based on the job identification information, even when the printer 2 stores a plurality of print jobs. Further, when the printer 2 stores print jobs received from a plurality of information processing devices, such as the PCs 1 and 3, print jobs for a specific logged-in user can be extracted and printed, and storage information for the specific logged-in user can be provided to the specific logged-in user based on the user information.

In S85 the CPU 11 performs rasterization based on the intermediate image data received from the general-purpose printing program 41 to generate print data. Subsequently, the CPU 11 ends the print data generation process of FIG. 10. The print data generated in S85 is in a format that the printer 2 can use for printing, such as page description language (PDL) data specific to the model of the printer 2. When generating print data from intermediate image data, the auxiliary program 42 may process (modify) the print image according to settings of items for which the image is to be processed.

Since the auxiliary program 42 is designed to support the printer 2, the auxiliary program 42 has a higher degree of freedom in rasterization than the general-purpose printing program 41 and can more likely generate print data suited for printing on the printer 2. Note that the print data generated by the auxiliary program 42 may be of a format that can be used for printing on printer models other than the model of the printer 2.

The print data may be generated by the general-purpose printing program 41 rather than the auxiliary program 42. In other words, the auxiliary program 42 may transfer to the general-purpose printing program 41 information indicating that printing is to be executed when determining that the printing is to be executed, that is, determining that transmission is not restricted. In this case, the general-purpose printing program 41 generates print data by rasterizing the intermediate image data generated in A63. The general-purpose printing program 41 then transfers the generated print data to the auxiliary program 42.

Print data generated by the general-purpose printing program 41 is data in an image format that various printers can use for printing, such as PWG Raster data or PDF data. Performing rasterization on the general-purpose printing program 41 reduces the processing load on the auxiliary program 42, thereby avoiding an increase in processing time and reducing the size of the auxiliary program 42.

Returning to FIG. 3, in A102 the auxiliary program 42 transmits a print job, that is, transmits the print data generated in the print data generation process of A101 to the printer 2 together with a print command instructing the execution of a print. In a case that the auxiliary program 42 receives print data (rasterized data) from the general-purpose printing program 41 the auxiliary program 42 associates the password, job identification information, and user information with the print data received from the general-purpose printing program 41 and sends all the associated data to the printer 2 together with a print command instructing the execution of printing as a print job. The process of A102 is an example of the transmitting process.

Upon receiving the print command and the print job including the print data, in A103 the printer 2 stores the image data included in the print job in nonvolatile memory of the printer 2 by storing the print job when the secure print setting included in the print job is set to "ON". After storing the print job, in A104 the printer 2 transmits a storage complete notification to the PC 1.

When the auxiliary program 42 receives the storage complete notification via the communication interface 14 in A104, in A105 the auxiliary program 42 notifies the user that the print job has been stored on the printer 2 by displaying a message on the user interface 13 encouraging the user to print the print job stored on the printer 2, e.g., "Your job has been stored on the printer and is ready to print." This reduces the possibility of the user forgetting to print out the printed matter. The auxiliary program 42 may erase the message reporting the completion of storage when the auxiliary program 42 receives a print complete notification from the printer 2, or may erase the message after the message has been displayed for a certain period of time or in response to a user operation. The process of A104 is an example of the storage information acquisition process. The process of A105 is an example of the notification process.

In A111 the user inputs a selection for a print job and a password on the control panel. Upon receiving this selection and password, in A112 the printer 2 determines whether the printing condition is met. The printer 2 determines that the printing condition is met when a password was acquired from the selected print job and the password received in A111 matches the password acquired from the print job. When the passwords match, in A121 the printer 2 executes printing. On the other hand, the printer 2 determines that the printing condition is not met when the password received from the user does not match the password acquired from the selected print job, for example. In this case, in A131 the printer 2 does not execute printing.

Note that the general-purpose printing program 41 may also transmit the print data (or the print job) and the like to the printer 2. That is, the auxiliary program 42 may transfer the generated print job including the print data to the general-purpose printing program 41 so that the print job can be sent from the general-purpose printing program 41 to the printer 2 as the destination. Accordingly, the general-purpose printing program 41 transmits the print job received from the auxiliary program 42 to the printer 2.

As described above in detail, the auxiliary program 42 according to the present embodiment acquires settings information from the printer 2 indicating whether or not to execute the secure print. When the acquired settings information indicates that the secure print is to be executed, i.e., when the settings information is "ON", the print job is automatically configured for the secure print. Thus, the auxiliary program 42 forcibly sets the print job to be printed as the secure print, even when operations were not performed on the PC 1 to set the secure print setting. Therefore, by incorporating the auxiliary program on PCs 1 and 3 connected to the printer 2, the setting indicating whether or not to perform the secure print can be shared among the PCs 1 and 3 so that the operations for secure printing are made uniform throughout the entire system.

Further, since the printer 2 can manage the execution of secure print in the present embodiment, the printer 2 facilitates the operations and management of secure print on the printing system 100. Further, when the settings information indicates "ON" for the secure print setting set in the printer 2, the auxiliary program 42 forcibly configures the setting included in the print job so that the print job is to be printed, even when the user of the PC 1 does not perform an operation to configure the secure print setting. This reduces the time and effort required for the user to configure the secure print setting in accordance with the settings information on the printer 2.

In the present embodiment, the printer 2 supports the secure print, and a password is included in the print settings of a print job to satisfy the printing condition for the secure print. Accordingly, the PCs 1 and 3 and other information processing devices in the system can be made to perform the secure print uniformly in the present embodiment. A particular feature of this embodiment is that the PC 1 receives a password and adds the password to the print job when the secure print setting in the print settings was changed from "OFF" to "ON" on the basis of the settings information set in the printer 2, so that the secure print can be executed properly.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below: For example, a device connected to the PC1 is not limited to the printer 2, but may be any devices having a printing function, such as a multifunction peripheral, a copying machine, and a facsimile machine. The number of devices connected to the PC1 is note limited to that shown in FIG. 1, but may be any number larger than or equal to two.

As described in A61-A64 and A71-A73 of FIG. 2, the PC 1 acquires settings information from the printer 2 in response to each print instruction, but the PC 1 may acquire settings information when the printer 2 is started up or when advanced print settings are configured, for example. The PC 1 may also acquire settings information in response to a user instruction. The auxiliary program 42 may also cache the acquired settings information by storing the acquired settings information in a nonvolatile area of the memory 12 and may read the cached settings information for subsequent prints, thereby reducing the number of communications with the printer 2.

Figure 8:
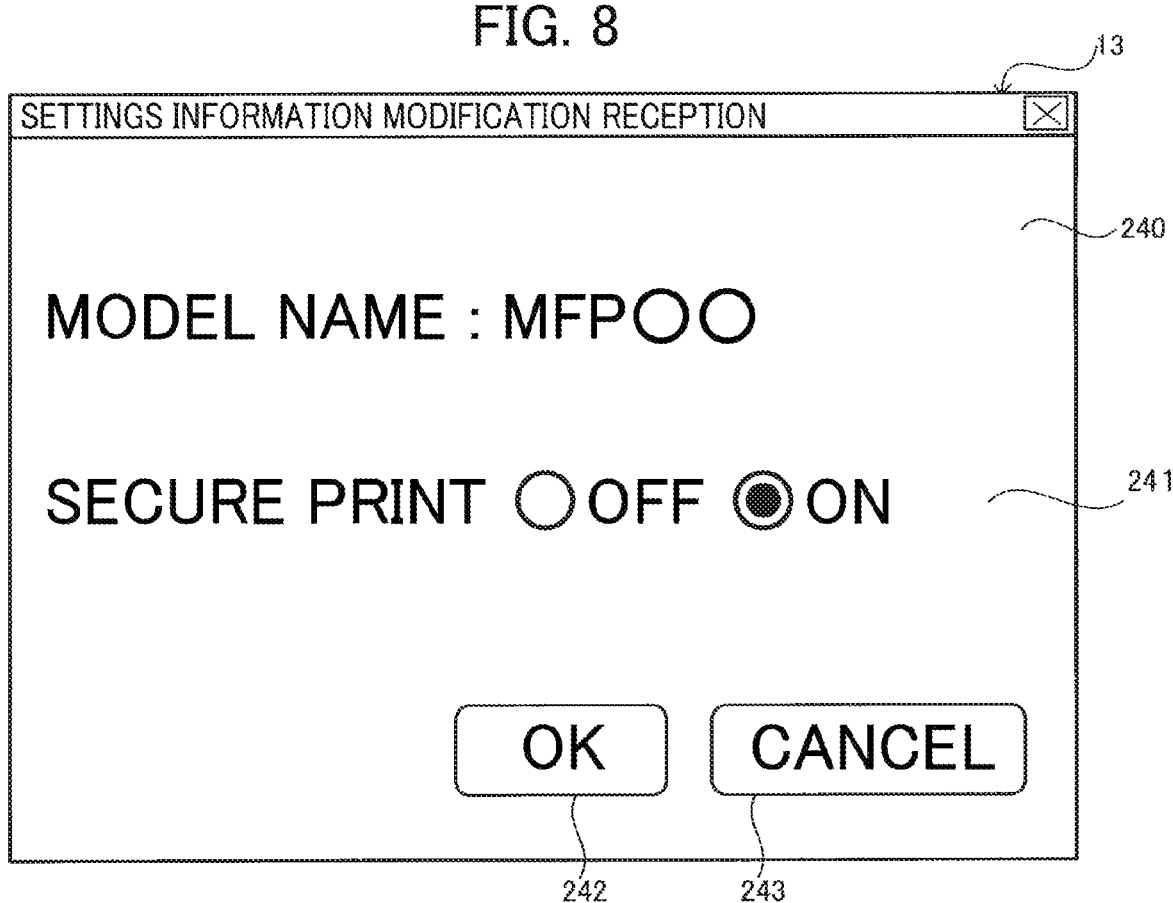
FIG. 8 is an explanatory diagram illustrating a settings information modification reception screen.

Screens, such as the notification screens including the messages 300A-300D shown in FIGS. 4A-4D, the advanced settings screen 230 shown in FIG. 5, and the settings information modification reception screen 240 shown in FIG. 8, are all merely examples to which the present invention is not limited.

The settings information may be managed by a management server that also manages the printer 2, rather than by the EWS 221 of the printer 2. In this case, the auxiliary program 42 receives printer-specifying information identifying the printer 2 and issues to the management server a request that includes this printer-specifying information requesting that the management server send settings information. The management server extracts the settings information associated with the printer-specifying information and returns this settings information as a response. The auxiliary program 42 acquires the settings information by receiving this settings information transmitted from the management server. In this case, the management server is an example of the external device. However, when the printer 2 manages the settings information and the auxiliary program 42 acquires the settings information from the printer 2, the stored-print setting for print jobs to be printed on that printer 2 may be automatically configured, thereby reducing the time and effort required for acquiring management information (the settings information). This also eliminates the need to provide a management server and the like for managing the settings information. Further, having the EWS 221 manage the settings information stored on the printer 2 and enabling the user to modify settings information by using the PC 1 through the web page of the EWS 221 facilitates the management of settings information for performing stored printing.

In the above embodiment, the auxiliary program 42 may acquire the number of printable pages calculated by the printer 2 from the printer 2 as the storage information. In this case, the printer 2 calculates the number of printable pages based on the maximum number of storable pages and storage information. Alternatively, the auxiliary program 42 may calculate the number of printable pages. In this case, the auxiliary program 42 acquires a maximum number of storable pages from the printer 2 and may calculate the number of printable pages based on the maximum number of storable pages and storage information acquired from the printer 2.

As described in A11-A13 and A71-A73 of FIG. 2, the storage information and settings information are acquired at different timings, but the settings information and storage information may be acquired from the printer 2 at the same timing. For example, the process in A11-A14 of FIG. 2 may be omitted, and the storage information may be acquired through the processes of A71-A73.

The transmission restriction determination process described in A81 of FIG. 2 may be omitted and the PC 1 may instead transmit the print job to the printer 2, even when the printing quantity of the print job exceeds the printable quantity based on the storage information. However, the auxiliary program 42 can avoid wasteful communications by restricting the transmission of print jobs when the printing quantity of the print job exceeds the printable quantity based on the storage information.

There is a plurality of types of stored printing. In addition to the secure print, there are various types of stored printing that do not require password input. One type of stored printing that does not require password input is a simple stored printing in which the only printing condition is that a print instruction is inputted. Another example of stored printing that does not require password input is secure function lock. The secure function lock is stored printing that prints under the condition (printing condition) that the user has logged in to the printer by inputting user information. While the stored printing supported by the printer 2 in the above embodiment is limited to the secure print, the printer 2 may support the secure function lock instead. In this case, the auxiliary program 42 need not display a password input field in the advanced settings screen 230 shown in FIG. 5 and need not accept a password when the stored print setting set in the printer 2 is "ON", and the process in S75-S81 of FIG. 10 may be omitted. The PC 1 may also accept a value for specifying whether or not the secure function lock setting is activated in the settings information modification reception screen 240 of FIG. 8. Alternatively, the printer 2 and the auxiliary program 42 may allow one or more of the settings to be selected and used from options including the simple stored printing, the secure print, and the secure function lock. In this case, information on the type of stored printing may be included in the settings information and the auxiliary program 42 may acquire this settings information from the printer 2, and request and transmit a password or other information according to the acquired type of stored printing.

In the above embodiment, only printing operations have been described in detail as the operations of the auxiliary program 42, but the auxiliary program 42 may have other roles and functions. Further, the program that executes the processes described in the embodiment is not limited to the auxiliary program 42 but may be another program that receives instructions from the OS 21 or the general-purpose printing program 41 when printing is performed using the general-purpose printing program 41. For example, a print workflow application having specifications published by Microsoft Corporation may be used as the program.

The execution timing of the auxiliary program 42 is not limited to the examples in the embodiment. For example, the auxiliary program 42 may be executed in response to an execution instruction received directly from the OS 21 or the auxiliary program 42 may be a resident program. In the case of a resident program, the auxiliary program 42 may perform the operations described above upon receiving an execution command.

In any of the flowcharts disclosed in the embodiment, the plurality of processes that make up any of a plurality of steps may be executed in parallel, or the order in which the processes are performed may be modified in any way that does not produce any inconsistencies in the processes.

The processed disclosed in the embodiment may executed by a single CPU, a plurality of CPUs, hardware such as an application specific integrated circuit (ASIC), a plurality of ASICs, or any combination of these devices. The processes disclosed in the embodiment may be embodied through a computer-readable storage medium storing a program implementing these processes or a method.

What is claimed is:

1. A non-transitory computer readable storage medium storing a support program installed on and executed by a computer included in an information processing device on which an operating system is installed, the operating system including a general-purpose printing program embedded therein, the support program supporting the general-purpose printing program and being associated with a printer communicable with the information processing device, the support program, when executed by the computer, causing the information processing device to perform:
   before a print job is sent to the printer, an acquisition process of acquiring, from an external device, settings information indicating whether or not stored printing is designated as a setting in the printer in advance, the stored printing defining a sequence of printing in which, after the printer stores received image data or image data converted from the received image data, the printer performs printing based on the stored image data when a printing condition is satisfied;
   before, the print job is sent to the printer, in response to the settings information indicating that the stored printing is designated as a setting in the printer in advance, a setting process of automatically setting, when the general-purpose printing program receives a print instruction to perform printing using the printer from an editing application program installed on the information processing device, a setting value for the print job based on the print instruction to a value indicating that the stored printing is to be performed by the printer, even when the print instruction does not include a specific setting for the stored printing; and
   a sending process of sending the print job and identification information for the print job to the printer.

2. The non-transitory computer readable storage medium according to claim 1, wherein the external device is the printer storing the settings information,
   wherein the acquisition process includes:
      sending an acquisition request to the printer; and
      receiving the settings information from the printer as a response to the acquisition request.

3. The non-transitory computer readable storage medium according to claim 2, wherein the support program, when executed by the computer, causes the information processing device to further perform:
   a display process of displaying, when the general-purpose printing program receives, from the editing application program, a display instruction to display a settings screen to receive print settings to be used in printing by the printer, the settings screen on a user interface of the information processing device, the settings screen including an operation icon to receive an instruction to access a web server embedded in the printer; and
   a web-page display process of displaying, when the operation icon is operated, a web page provided from the web server on the user interface, the web page being to receive an instruction to modify the settings information in the printer.

4. The non-transitory computer readable storage medium according to claim 1, wherein the printing condition includes a condition that authentication information is received and a condition that an authentication process is successful using the received authentication information,
   wherein the sending process includes:
      including print-job authentication information in the print job when the setting value indicates that the stored printing is to be performed,
   wherein the sending process includes sending the print job including the print-job authentication information to the printer so that the print-job authentication information is to be used in the authentication process.

5. The non-transitory computer readable storage medium according to claim 4, wherein the support program, when executed by the computer, causes the information processing device to further perform:
   acquiring an original setting value indicating whether or not the stored printing is to be performed,
   wherein when the original setting value indicates that the stored printing is not to be performed, the setting value is set in the setting process to indicate that the stored printing is to be performed by modifying the original setting value to indicate that the stored printing is to be performed,
   wherein the support program, when executed by the computer, causes the information processing device to further perform:
      receiving the print-job authentication information to be included in the print job when the setting value is set in the setting process by modifying the original setting value.

6. The non-transitory computer readable storage medium according to claim 1, wherein the support program, when executed by the computer, causes the information processing device to further perform:
   an information acquisition process of acquiring, from the printer, storage information on one or more print jobs stored in the printer; and
   a notification of related information related to the storage information using a user interface provided in the information processing device.

7. The non-transitory computer readable storage medium according to claim 6, wherein the support program, when executed by the computer, causes the information processing device to further perform:
   receiving user information for identifying a user,
   wherein the related information includes information on one or more extracted print jobs associated with the user information from among the one or more print jobs stored in the printer.

8. The non-transitory computer readable storage medium according to claim 6, wherein the support program, when executed by the computer, causes the information processing device to further perform:
- a restriction process of restricting sending the print job in the sending process when a print amount determined from the print job exceeds a printable amount determined from the storage information.

9. A system comprising:
- a printer configured to perform stored printing, and comprising a memory storing a setting designating the stored printing, the stored printing defining a sequence of printing in which, after the printer stores received image data or image data converted from the received image data, the printer performs printing based on the stored image data when a printing condition is satisfied; and
- an information processing device communicable with the printer, the information processing device including an operating system installed thereon, the operating system including a general-purpose printing program embedded therein, wherein when a support program supporting the general-purpose printing program is installed on and executed by the information processing device, the support program causes the information processing device to perform:
  - before a print job is sent to the printer, an acquisition process of acquiring, from an external device, settings information indicating whether or not the stored printing is designated as the setting in the memory;
  - before the print job is sent to the printer, in response to the settings information indicating that the stored printing is designated as the setting, a setting process of automatically setting, when the general-purpose printing program receives a print instruction to perform printing using the printer from an editing application program installed on the information processing device, a setting value for the print job based on the print instruction to a value indicating that the stored printing is to be performed by the printer, even when the print instruction does not include a specific setting for the stored printing; and
  - a sending process of sending the print job and identification information for the print job to the printer.

10. The system according to claim 9, wherein the external device is a server and wherein the settings information is acquired from the server.

11. The system according to claim 9, wherein the setting designating the stored printing is received by the printer from another information processing device.

12. The system according to claim 11, wherein the another information processing device is an administrator terminal.

13. The system according to claim 11, wherein the setting designating the stored printing is received by the printer using a control panel on the printer.

* * * * *